UNITED STATES PATENT OFFICE.

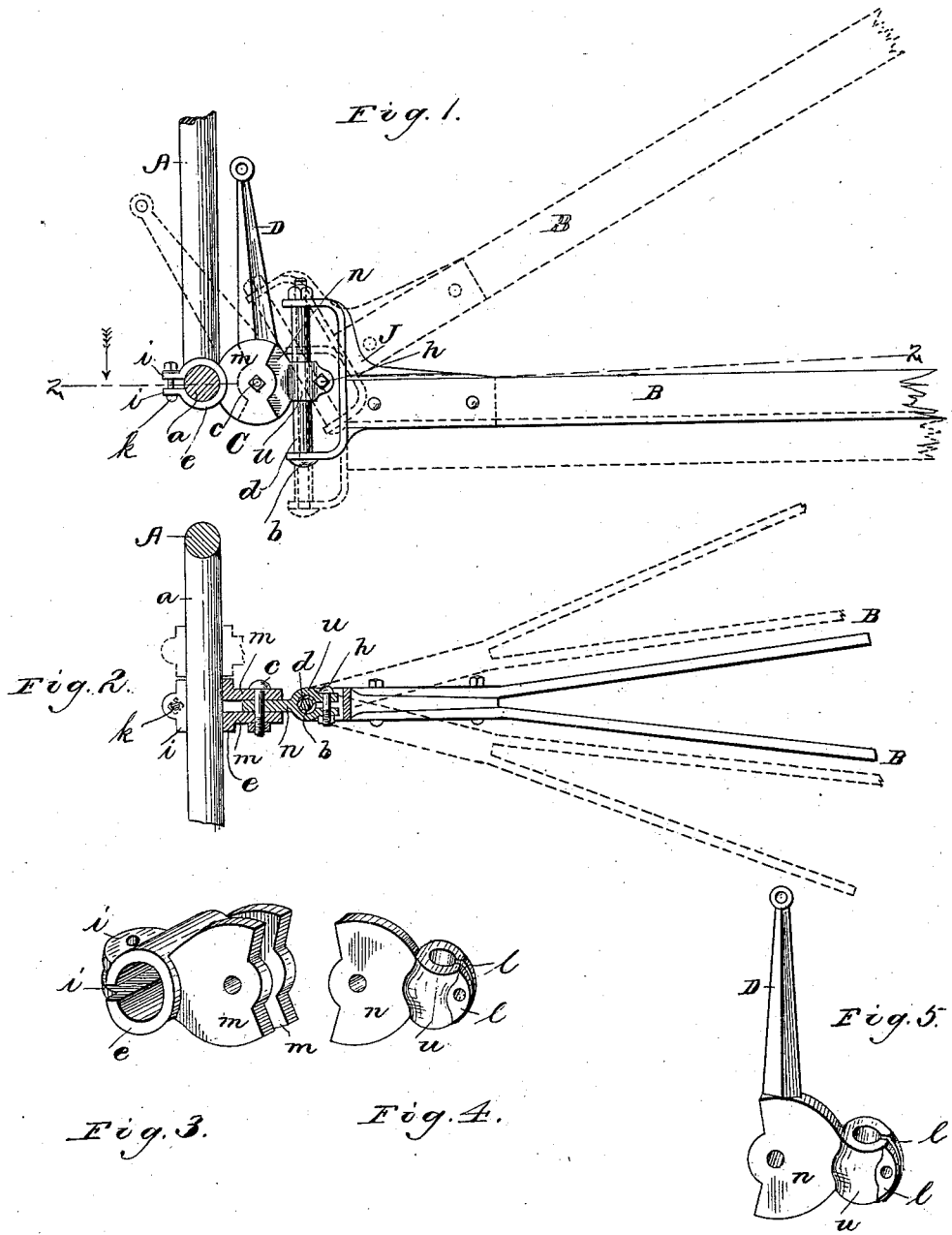

THOMAS PATES, OF ALTON, ILLINOIS, ASSIGNOR TO THE HAPGOOD PLOW COMPANY, OF SAME PLACE.

CULTIVATOR.

SPECIFICATION forming part of Letters Patent No. 308,694, dated December 2, 1884.

Application filed September 1, 1884. (No model.)

*To all whom it may concern:*

Be it known that I, THOMAS PATES, a citizen of the United States, residing at Alton, in the county of Madison and State of Illinois, have invented a new and useful Improvement in Cultivators, of which the following is a specification.

My invention relates to that class of cultivators known as "straddle-row walking-cultivators;" and it consists in an improved coupling for connecting the drag-bars to the axle, and also further consists in providing a spring-attachment arm to the said coupling; and the object is to provide an inexpensive, more substantial, and a better holding of the gangs upright than has heretofore been used.

Referring to the drawings, like letters refer to like parts in all the figures, in which Figure 1 is a side elevation view showing the parts of the cultivator in which my improvements lie, and in which A represents the well-known arched axle provided with horizontal arms $a$, to which the drag-bars B are connected by my improved coupling C. Fig. 2 is a plan or top view of same, taken on the dotted line $z\ z$, Fig. 1, showing how the drag-bars have a lateral movement, pivotal at $b$, and a perpendicular movement, pivotal at $c$, while being held rigidly upright by the coupling C. Figs. 3 and 4 are perspective views, enlarged, of my improved coupling C, the parts disconnected to show the construction. Fig. 5 is a perspective view, enlarged, of the rear part of the coupling C, showing how a spring-attachment arm, D, may be constructed or connected therewith.

My improved cultivator is provided with wheels, arched axle, tongue, and two gangs of shovels or plows with drag-bars, as usual in straddle-row cultivators.

A represents the arched axle, provided with horizontal arm $a$; B, the drag-bars, having their front ends attached to the yoke J, and the said yoke provided with the pipe or sleeve $d$ and pivotal bolt $b$, forming a hinged joint, for lateral play of the gang, all of which may be of ordinary well-known construction. The said sleeve $d$ is preferably made with cone-shaped bearing ends seated in the arms of the said yoke, and the bolt $b$, extending through the said arms and sleeves, as shown, by which the said sleeve may be a loose fit on the bolt, and held in position by the pressure of the said arms on the ends of the sleeve, and the slack by wear in use may be taken up by tightening the nut on the said bolt, springing the said arms according to the wear.

My improved coupling consists of two parts or collars hinged together—one part or collar adapted to be rigidly attached to the axle-arm, the other connected to the gang or drag-bars, and the said hinge adapted to hold the gang upright.

C represents my improved coupling, made in two parts, hinged together as shown, the front part consisting of an open-mouthed collar, $e$, provided with lips $i\ i$, the said collar clasping the arm $a$, and a bolt, $k$, inserted in the said lips, rigidly clamping and securing the said collar to the axle. The said collar $e$ is also provided with two wings, $m\ m$, extending rearward therefrom, with an open even space between them, and with a central perforation to admit the pivotal bolt $c$, as shown. The said wings $m\ m$ may be circular disks with their rear part cut away to make a close or short connection between the axle and drag-bars, and the said wings extending higher and lower from the pivotal bolt $c$, to afford a strong and secure holding of the drag-bars upright; the rear part consisting of an open-mouthed collar, $u$, provided with perforated lips $l\ l$, the said collar $u$ clasping the pipe or sleeve $d$, and the bolt $h$ inserted in the said lips, rigidly connecting the said collar to the sleeve and drag-bar. The said collar is also provided with the wing $n$, extending forward between the two wings $m\ m$, and the bolt $c$, connecting them pivotally, forming a hinged joint, by which the said rear part may have a movement up and down pivotally on the bolt $c$, and held rigidly upright without lateral or twisting movement. It will be observed that the said two collars are at right angle to each other, their mouths in opposite direction, and their backs hinged together, as shown in the drawings; that both collars are rigidly attached to their respective parts; that the bolt in the said lips draws and springs the collar to a snug fit without work in fitting them, and that thereafter there can be no wear in use, consequently no slack to be taken up. It will also be observed that the said wings m m and n are provided with flat meeting faces of easy construction in casting them, whereby little or no work is required thereafter in fitting them, and when worn by use, so as to become slack-jointed in the hinged joint, such slack may be taken up by tightening the nut on the bolt c, drawing and springing the two wings m m, firmly seated on the wing n. The front part of the said coupling or collar e may be adjusted laterally on the axle-arm for wide or close working in any desired position by loosening and tightening the bolt k, and the rear part or collar u may be adjusted up and down on the sleeve d for deep or shallow work by loosening and tightening the bolt b, by which the two gangs of plows may have a wide range of adjustability both laterally and perpendicularly.

D represents a spring-attachment arm which I sometimes use in connection with my improved coupling C, as shown in Fig. 5, also shown in Fig. 1, consisting of a horn or arm projecting from the top of the wing n on the rear part of the said coupling, directly over the hinged joint c, and the top end of the said arm D adapted to be connected to the well-known spring used in cultivators to assist in elevating the gangs, which said spring-attachment arm operates as a lever to rock the rear part of the said coupling on the pivotal bolt c, carrying the gang therewith, as will be understood by inspecting the drawings.

I am aware that open collars or couplings to be compressed by a bolt are not new, and also am aware that broad-faced vertical bearings to hold drag-bars upright have heretofore been used. Therefore such I do not broadly claim.

Having thus set forth my invention, what I claim, and desire to secure by Letters Patent, is—

1. In a cultivator, the two-part coupling connected by a hinged joint, each part provided with a collar and one or more vertical faced wings or bearings, and the rear part provided with a spring-attachment arm adapted to be connected and co-operate with a spring to rock the said rear part on a pivotal bolt, substantially as and for the purpose set forth.

2. In a cultivator, the coupling consisting of two parts hinged together, the front part rigidly attached to the axle, the rear part provided with a spring-attachment arm adapted to be connected and co-operate with a spring to rock the said rear part on the pivotal bolt or hinged joint, substantially as and for the purpose set forth.

3. In a cultivator, the combination of the spring-attachment arm with the coupling, consisting of two parts connected by a hinged joint, the front part rigidly attached to the axle, the rear part connected to the drag-bars, the said arm adapted to co-operate with a spring to rock the said rear part on the said hinged joint, substantially as and for the purpose set forth.

4. In a cultivator, the combination of the spring-attachment arm D with the collar u, provided with the wing n, the drag-bars B, with the yoke J, sleeve d, and bolt b, the collar e, provided with wings m m, and the axle A and pivotal bolt c, substantially as and for the purpose set forth.

5. In a cultivator, the coupling consisting of two parts connected by a hinged joint, and adapted to connect the drag-bars to the axle, one of said parts rigidly attached to the axle, the other part connected to the drag-bars, the said hinged joint permitting a perpendicular play of the said drag-bars and adapted to hold them rigidly upright, substantially as and for the purpose set forth.

6. In a cultivator, the two-part coupling connected by hinged joint and vertical bearings, each said parts provided with a collar provided with open mouth and perforated lips, with a bolt adapted to compress said lips, all substantially as and for the purpose set forth.

7. In a cultivator, a two-part coupling consisting of a collar rigidly attached to the axle, and provided with wings and a hinged joint, and a rear part connecting with the drag-bars, said wings or hinged joint adapted to hold the said drag-bars upright, while permitting them perpendicular play pivotally on the said hinged joint, substantially as and for the purpose set forth.

THOMAS PATES.

Witnesses:
CHAS. S. PHILIPS,
WM. R. PINCKARD.